US005568935A

United States Patent [19]
Mason

[11] Patent Number: 5,568,935
[45] Date of Patent: Oct. 29, 1996

[54] RECUMBENT CYCLE WITH IMPROVED DRIVE AND STEERING

[76] Inventor: William P. Mason, 111 S. Main St., Deerfield, Wis. 58531

[21] Appl. No.: 488,707

[22] Filed: Jun. 9, 1995

[51] Int. Cl.$^6$ .................................................. B62K 5/04
[52] U.S. Cl. ........................ 280/282; 280/266; 280/288.1
[58] Field of Search .................................... 280/263, 266, 280/267, 281.1, 282 O, 288.1

[56] References Cited

U.S. PATENT DOCUMENTS

| | | | |
|---|---|---|---|
| 4,198,072 | 4/1980 | Hopkins | 280/288.1 X |
| 4,279,429 | 7/1981 | Hopkins et al. | 280/266 X |
| 4,359,231 | 11/1982 | Mulcahy | 280/288.1 X |
| 4,432,561 | 2/1984 | Feikema et al. | 280/288.1 X |
| 4,526,392 | 7/1985 | Berkstresser | 280/288.1 X |
| 4,572,535 | 2/1986 | Stewart et al. | 280/288.1 X |
| 4,789,173 | 12/1988 | Lofgren et al. | 280/288.1 |
| 5,354,084 | 10/1994 | Lofgren et al. | 280/266 |

OTHER PUBLICATIONS

Advertisement from the RCN Buyers Guide of 1995, p. 13.
Advertisement from the RCN Buyers Guide of 1995, p. 26.
Advertisement from the RCN Buyers Guide of 1995, p. 32.
Advertisement from the RCN Buyers Guide of 1995, p. 33.

*Primary Examiner*—Kevin Hurley
*Attorney, Agent, or Firm*—Leydig, Volt & Mayer, Ltd.

[57] ABSTRACT

A recumbent cycle with improved steering and drive assemblies is provided. The recumbent cycle is of the tricycle type having two rear wheels spaced-apart and rotatably supported on an axle and a single front wheel. A frame assembly, including a seat disposed in a recumbent position and fixed to a tubular frame, is pivotally attached to the axle, and includes a forward mount for rotatably supporting the front wheel. A pedal/crank drive is included for rotating the front wheel and, therefore, propel the cycle. A steering assembly is also provided for pivoting and tilting the frame assembly with respect to the rear axle. The frame and the seat tilt into the turn as the frame is pivoted relative to the rear axle. The front wheel being carried on the frame assembly, pivots along with the frame assembly to effectively point the front wheel in the intended direction of travel, and therefore steer the cycle.

20 Claims, 6 Drawing Sheets

RECUMBENT CYCLE WITH IMPROVED DRIVE AND STEERING

FIELD OF THE ART

The present invention generally relates to recumbent cycles, and more particularly concerns improved drive and steering assemblies for such recumbent cycles.

BACKGROUND OF THE INVENTION

Recumbent cycles are well known, and like traditional cycles are used for sport, exercise, or merely pleasure riding. Generally characterized by foot pedals placed in front of, rather than below, the cycle seat, recumbent cycles include various two-wheel, three-wheel and four-wheel models. Some three-wheel models have a single front wheel and two rear wheels, while others have two front wheels and a single rear wheel. In such known three-wheel recumbent cycles, whether of the single front wheel type or of the single rear wheel type, the steering is typically controlled by turning the single wheel. In those models having a single front wheel, the wheel is turned into the intended direction of travel, while the single rear wheel models turn the single wheel away from the desired travel direction.

Although the steering of such three-wheel recumbent cycles is usually accomplished by turning the single wheel (either front or rear), the seat is generally arranged to remain upright and parallel to the ground. When turning at relatively high speeds, this tends to exert an undue centrifugal force on the rider. As a result, turning tends to be uncomfortable for the rider and such cycles have a tendency to become unstable and may even tip when attempting to turn at relatively high rates of speed.

Another observation regarding recumbent cycles, including both two-wheel and three-wheel models, relates to the drive mechanism. Typically, rotary foot pedals attached to a two arm crank are disposed well ahead of the seat for rotation by a rider. A sprocket and chain assembly transfers the rotation of the foot pedals and crank to an axle or wheel of the cycle, thereby imparting driving rotation to the wheel to propel the cycle. Generally, the chain assembly extends from the foot pedal sprocket, located near the front of the cycle, to the rear wheel or axle. Long chains usually require multiple idler rollers or assemblies to keep the chain running straight and prevent excessive chain sagging. Moreover, wear and stretch of such long extensions of chain are known to produce greater amounts of wear and slack, and therefore have a greater tendency to derail from the sprocket assemblies. The added slack also requires more maintenance and to some degree reduces drive responsiveness. Finally, because drive chains are offset from the central axis of the frame, long chains induce more bending and deflection in the frame when large forces are applied to the foot pedals.

SUMMARY OF THE INVENTION

Accordingly, it is a primary aim of the present invention to provide a recumbent cycle having improved steering and drive characteristics.

A more specific object of the present invention is to provide a recumbent cycle which may comfortably turn at relatively high speeds without tipping.

Another object of the present invention is to provide a recumbent cycle having an improved steering assembly which provides for greater stability during turning.

Still another object of the present invention is to provide a recumbent cycle having an improved drive mechanism which is more reliable, responsive and requires less maintenance.

Additional objects, advantages and other novel features of the invention will be set forth in the detailed description that follows with reference to the accompanying drawings and will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a recumbent cycle having two rear wheels disposed in parallel spaced-apart relation and rotatably supported on a rear axle. A frame assembly, including a seat disposed in a recumbent position and secured to the frame, is attached to the rear axle. The frame assembly further includes a forward mount disposed to rotatably support a front wheel. Drive means are included for rotating the front wheel and, therefore, propel the cycle. The drive means may include manually operated foot pedals, or alternatively a motorized drive mechanism. Finally, steering means are provided for simultaneously pivoting the frame assembly and the rear axle with respect to one another. Since the front wheel is carried on the frame assembly, pivoting the frame assembly effectively points the front wheel in the intended direction of travel. The pivot assembly is further arranged to incline the frame and the seat to the inside of a turn thereby increasing the stability of the cycle and the comfort and safety of the rider.

BRIEF DESCRIPTION OF THE DRAWINGS

The accompanying drawings incorporated in and forming a part of the specification, illustrate several aspects of the present invention, and together with the description serves to explain the principals of the invention. In the drawings.

Figure 1:
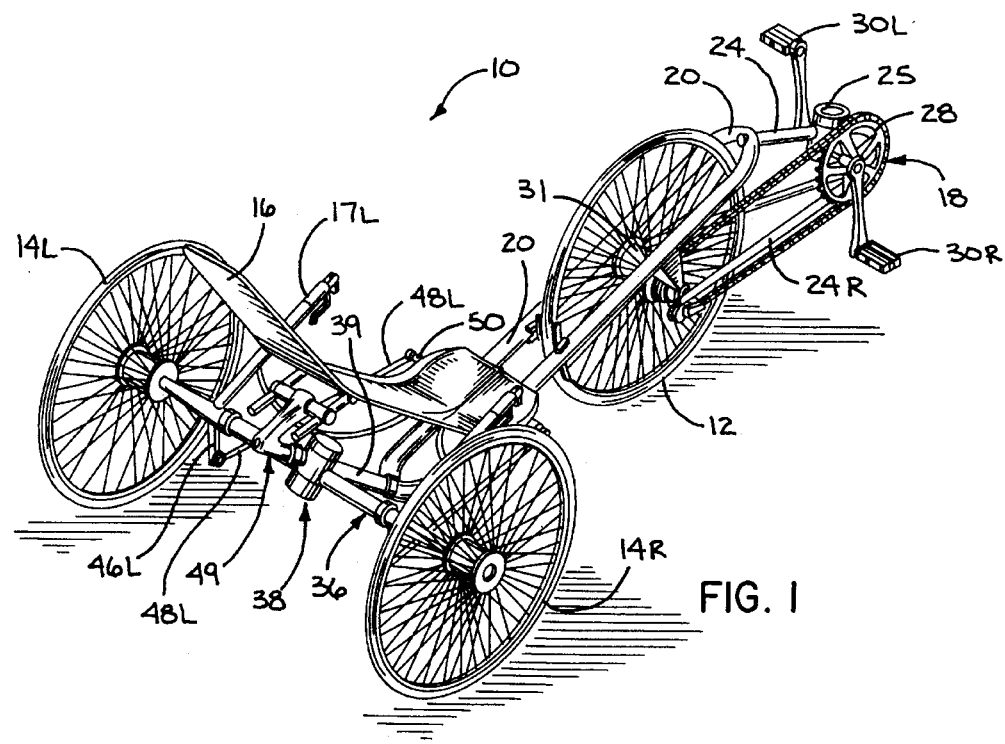
FIG. 1 is a perspective view of the preferred three-wheel recumbent cycle having the improved steering and drive assemblies of the present invention.

Reference will now be made in detail to various present preferred embodiments of the invention, examples of which are illustrated in the accompanying drawings. While the invention will be described in connection with these embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENT

Referring now to the drawings, FIGS. 1, 2, 3, and 4 show various views of the preferred embodiment of a recumbent cycle, generally designated by reference numeral 10. The recumbent cycle 10 has a tricycle configuration and includes a front wheel 12, two rear wheels, 14L and 14R, a seat 16, and steering levers 17L and 17R. It will be noted that many component parts of the cycle described herein are mirrored on both the left hand side and the right hand side of the cycle 10. Accordingly, suffixes "L" and "R" will be used in connection with the reference numerals illustrating such components.

Figure 2:
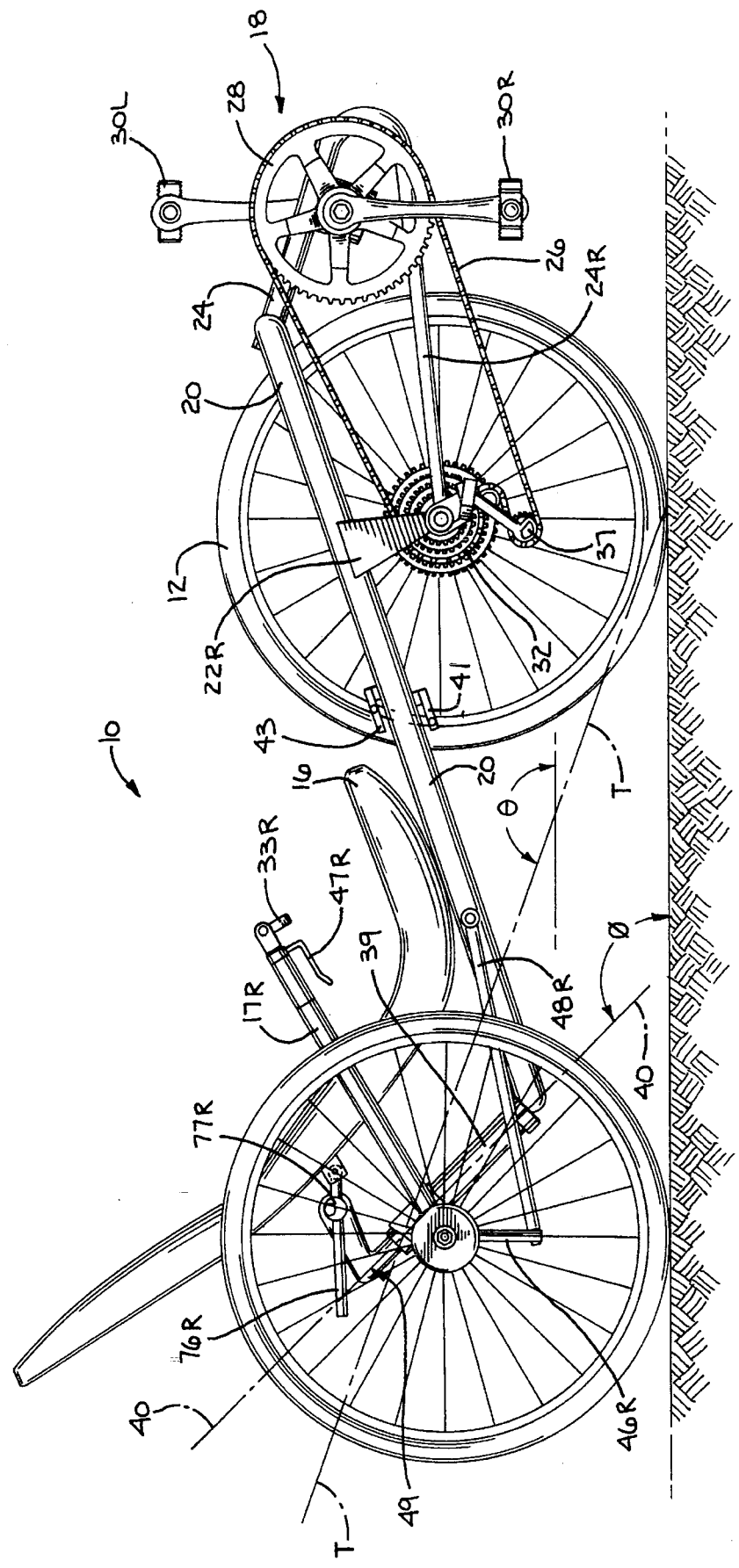
FIG. 2 is a side-view of the cycle illustrated in FIG. 1.
Figure 3:
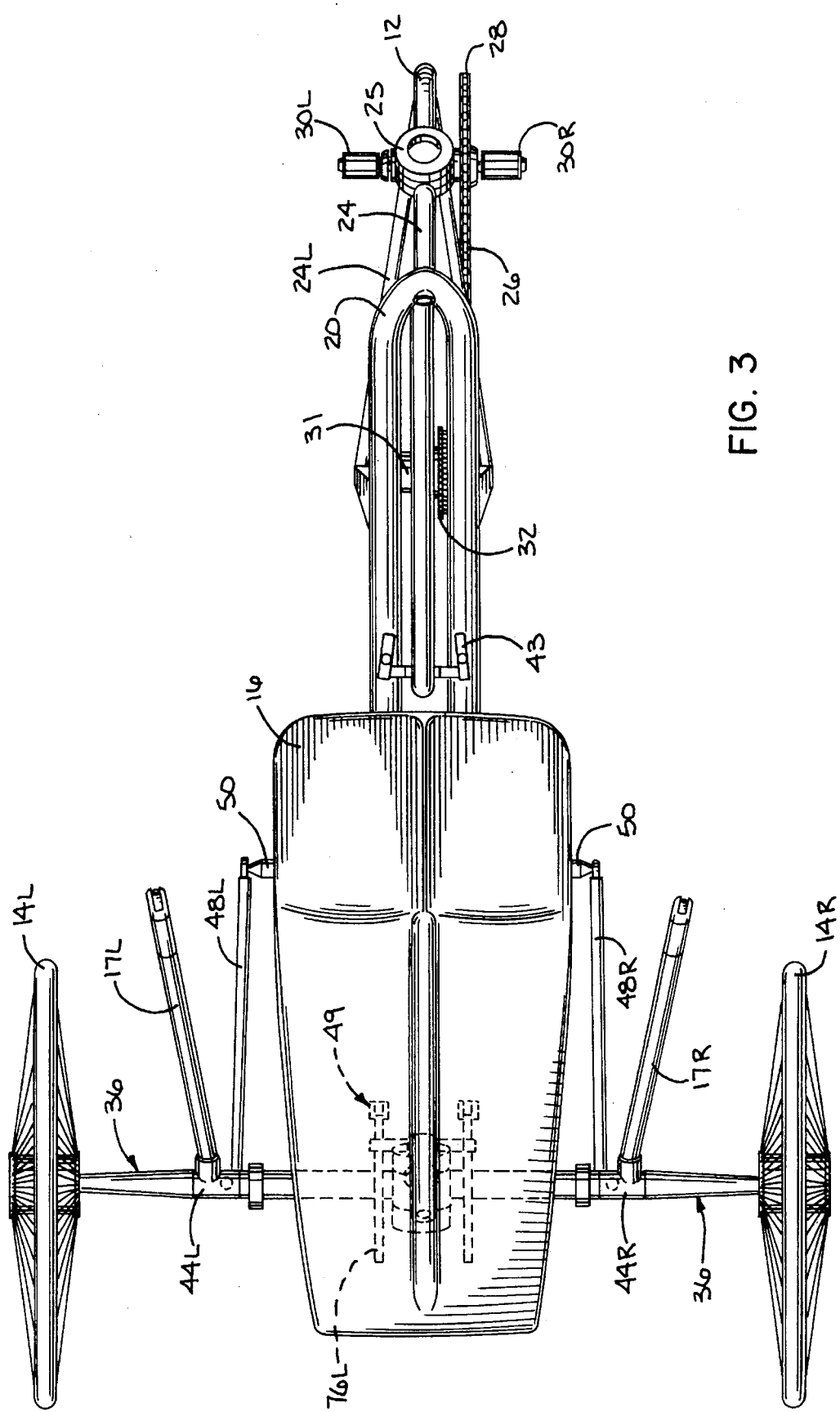
FIG. 3 is a top view of the cycle illustrated in FIG. 1.

As shown most clearly in FIG. 2, the seat 16 is disposed in a recumbent position in relation to a pedal assembly 18. More particularly, the pedal assembly 18 is placed in front of the seat 16, rather than below the seat as in traditional cycles. This allows the cycle to maintain a low profile with the ground and, therefore, provide a sleek appearance having enhanced aerodynamic characteristics. In addition, many fitness experts advocate recumbent cycling over traditional cycling as a preferred form of exercise, because the leg muscles being exercised by the rider are positioned at approximately the same elevation as the heart. Furthermore, recumbent cycling offers a desirable change in orientation and pace over traditional cycling.

In keeping with the preferred embodiment, the seat 16 is secured to a tubular frame 20. Brackets 22L and 22R are fixedly attached, such as by welding, and depend from the frame 20 to form a mount for rotatably supporting the front wheel 12. Support arms 24L and 24R, extending between the nose of the frame 20 and the axle of the front wheel 12, help support the wheel 12 and increase the rigidity of the frame 20. It can appreciated that seat 16, frame 20, brackets 22R and 22L, and supports 24R and 24L combine to form a relatively rigid and sturdy frame assembly.

Consistent with the concepts and teachings of the present invention, it will be appreciated that the frame 20, while illustrated as a tubular frame, may be fabricated of various alternative constructions with equal effectiveness. For example, the frame may be a truss structure, a box section structure, or honeycomb panel construction, to name a few. Similarly, the material composition of the frame may be steel, aluminum, titanium or a composite plastic material. It will be understood by those skilled in the art that the particular frame construction and material will be selected based upon the intended application of the cycle. For example, if the cycle is intended primarily for racing, then a tubular construction utilizing light weight aluminum may be preferred. If, however, off-road cycling is the intended use, then a heavier box section or sturdier truss construction may be desired. The particular construction will also be dictated in part by the intended user. For instance, a more cost effective structure will be preferred for hobbyists or recreational cyclists than will be preferred by competitive cyclists.

In accordance with the present invention, an improved drive means is provided to propel the cycle. Preferably, the drive means is in the form of a pedal and crank assembly 18 in combination with a chain 26 and sprocket assemblies 28 and 32. More particularly, the pedal and crank assembly 18 includes foot pedals 30R and 30L disposed for rotation by a rider. As is conventional in cycle drives, a chain 26 extends from a relatively large sprocket 28, positioned at the pedal assembly 18, to a relatively smaller sprocket 32 that is fixed in alignment with the hub and axle 31 of the front wheel 12, whereby rotation of the pedal assembly 18 is translated to the front wheel 12. Indeed, as is known by translating the rotation of the pedal assembly 18 from a relatively large sprocket 28 to a relatively small sprocket 32, a desired driving ratio is achieved. In this regard, one full rotation of the pedal assembly 18 imparts more than one revolution of the front wheel 12. As is also conventionally known, the sprocket 32 is clutched so that wheel 12 may continue to freely rotate in the forward direction when the rider stops pedalling. It can be appreciated that the drive means of the present invention may be implemented as shown, or may alternatively include a motorized assembly disposed to rotate the front wheel 12 of the cycle 10.

It has been found that the relatively short chain linkage between pedal sprocket 28 and front wheel sprocket 32 achieves improved performance over longer linkages extending, for example, from the pedal sprocket 28 to the rear axle 36. Not only is there more play and stretch in the linkage with the longer chains, but longer chain assemblies are more costly to manufacture and maintain, and also induce more bending and deflection in the main frame and tend to derail more frequently.

As illustrated, sprocket 32 includes several, preferably seven, coaxially aligned sprockets of varying sizes to provide a plurality of gear ratios. Also, the front wheel 12 is preferably mounted on a drive hub 31 having an internal three-speed shift assembly. Thus, the seven gear sprocket 32 and three speed hub 31 provide 21 drive speeds. Although illustrated as a single sprocket for simplicity, sprocket 28 may similarly include multiple sprockets of varying size. In this way, the drive ratio (i.e., revolutions of front wheel per revolutions of pedal assembly 18) may be even further varied if desired by the rider.

Shifters 33R and 33L are provided on the end of steering levers 17R and 17L to select the desired gear for the internal gear hub 31 and rear gear sprockets 32, respectively. For example, a cable (not shown) preferably routed either through or closely alongside the frame 20, extends between shifter 33R and a derailleur 37. As is known, the derailleur 37 adjusts to align the chain 26 with a selected one of the multiple sprockets 32. Similarly, shifter 33L may be connected via a shifting cable to the internal gear hub 31 for changing gears therein or to a second derailleur disposed at sprocket 28, if multiple pedal sprockets are provided.

Also conveniently located on the steering levers 17R and 17L, hand controls 47R and 47L for brakes are provided. Like the shifting assembly, brake cables extend from the hand controls 47R and 47L to caliper brakes 41 and 43. As is known, variable pressure applied at the hand controls 47R and 47L, varies the clamping pressure applied by the brakes 41 and 43 to the rim of the wheel 12. In an alternative embodiment, it may be desired to provide a disc or drum brake for the front wheel 12.

In further keeping with the invention and as depicted in the preferred embodiment, the rear wheels 14L and 14R are disposed in parallel, spaced-apart relation and rotatably supported on an axle 36. Centrally disposed along the rear axle 36, a hinge or pivot housing 38 is provided to receive an upwardly angled extension or pivot post 39 of the tubular frame 20. Thus, the pivot post 39 is received within the housing 38 and forms a rotational engagement therein. Preferably, a split brace 49 is included to provide additional support and rigidity to the seat 16. It should be understood, and as will be described in more detail below, the steering of the present preferred cycle 10 is effected by simultaneously pivoting and tilting the frame assembly and the rear axle 36 with respect to one another. As the frame assembly tilts and pivots, the extension 39 of frame 20 rotates within housing 38 about a pivotal axis 40.

For purposes of the present invention, the significance of the steering assembly is that turning is effected by both pivoting and tilting the frame assembly with respect to the rear axle 36. The illustrated embodiment shows the extension 39 of frame 20 received and engaged by the pivot housing 38 clamped to the rear axle 36. It can be appreciated that, consistent with the broader concepts of the present invention, the seat 16 may be similarly connected to pivot post 39 to pivot therewith. That is, a direct attachment between the seat 16 and the pivot post 39 may be formed. Furthermore, various forms of pivot means may similarly be utilized without departing from the invention.

Figure 6:
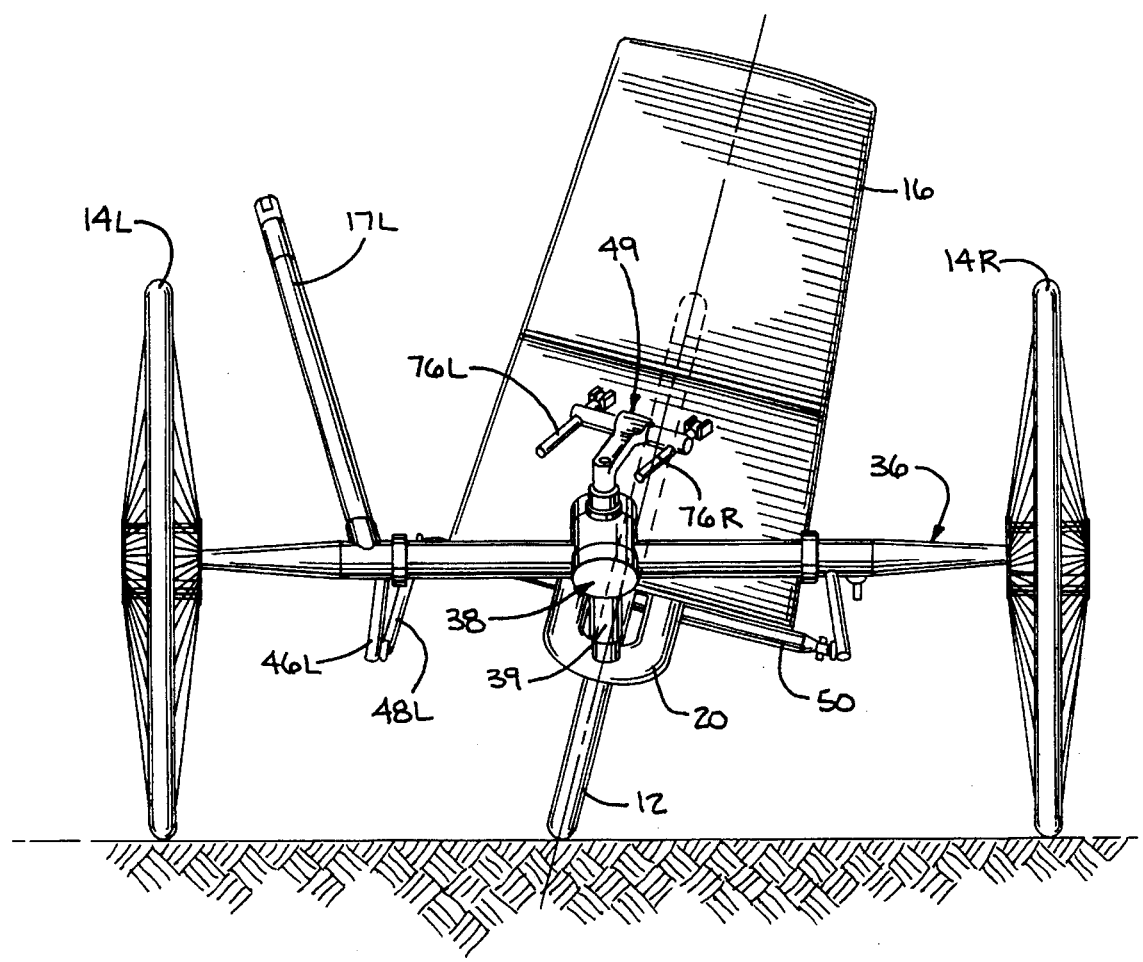
FIG. 6 is a rear view of the recumbent cycle of FIGS. 1–4, illustrating a right-hand turn.
Figure 7:
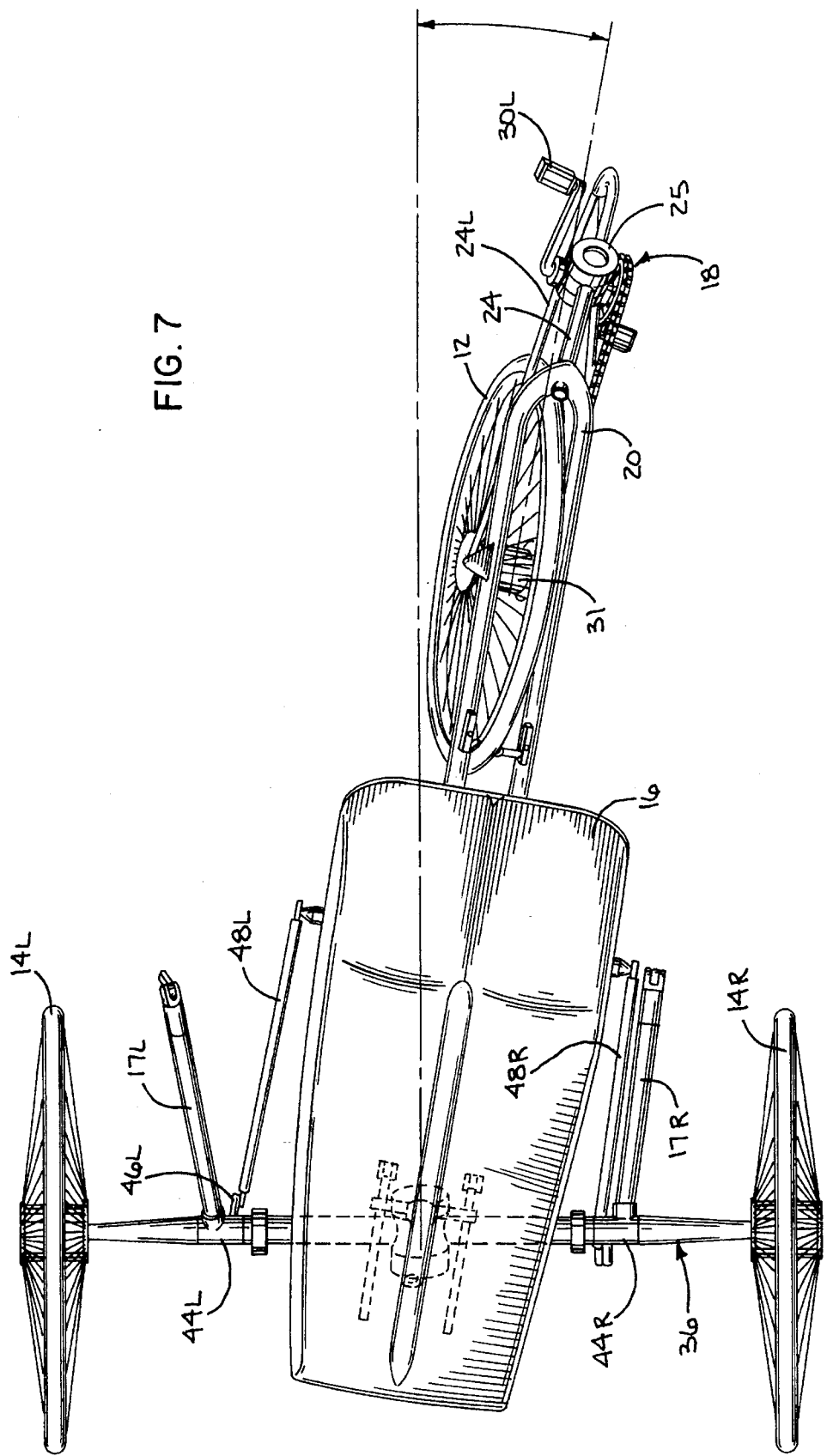
FIG. 7 is a top view of the recumbent cycle of FIG. 6, illustrating a right-hand turn.

To control the tilting of the frame assembly and pivoting of the rear axle 36 with respect to one another and, therefore, the steering of cycle 10, steering levers 17L and 17R are provided. The steering levers are sleeved at 44L and 44R onto axle 36, and therefore achieve a rotational relationship with axle 36. Crank arms 46L and 46R depend from sleeves 44L and 44R respectively, and rotate along with levers 17L and 17R. Tie-rods 48L and 48R extend between crank arms 46L and 46R and a cross support 50, which is attached to frame 20. As can be better understood by reference to FIGS. 6 and 7, rotation of steering levers 17L and 17R effect a reciprocating motion to tie-rods 48L and 48R. More particularly, FIGS. 6 and 7 show rear and top views of the cycle 10, with the steering levers and linkages positioned to illustrate a right-hand turn.

It will be understood that, due to the linkage and interconnection of steering levers 17, crank arms 46, tie-rods 48 and cross support 50, the steering levers operate in opposing fashion. That is, as lever 17R is rotated forwardly about axle 36, lever 17L is rotated rearwardly about the axle 36. More specifically, a rider desiring to make a right hand turn will push forward on lever 17R while pulling back on lever 17L. The forward rotation of lever 17R will move crank arm 46R and tie-rod 48R in the rearward direction. At the same time, crank arm 46L and tie-rod 48L will move in the forward direction, thereby rotating the frame extension or pivot post 39 within the pivot housing 38 to tilt the frame assembly about the pivot axis 40 with respect to rear axle 36 and simultaneously pivot the rear axle 36 relative to the frame. As the relatively rigid frame assembly tilts and pivots relative to the rear axle, the front wheel 12, being carried by brackets 22 and supports 24 also tilts and pivots with respect to the rear axle 36, and therefore angles to the right. Accordingly, the cycle 10 turns to the right. Similarly, when desiring to make a left hand turn, steering lever 17L is pushed forward and 17R is pulled rearwardly. It is preferred that, as illustrated, the pivot housing 38, pivot post 39, and pivot axis 40 are all disposed at an oblique angle. Therefore, as the frame assembly pivots about the axis 40 with respect to axle 36, both banking (i.e., tilting) and turning (i.e., left or right) orientation are simultaneously achieved. In other words, as the cycle turns, the seat, and therefore the rider, are comfortably banked into the turn. This not only increases the stability of the cycle 10, but also improves the safety and comfort of the cyclist.

Figure 4:
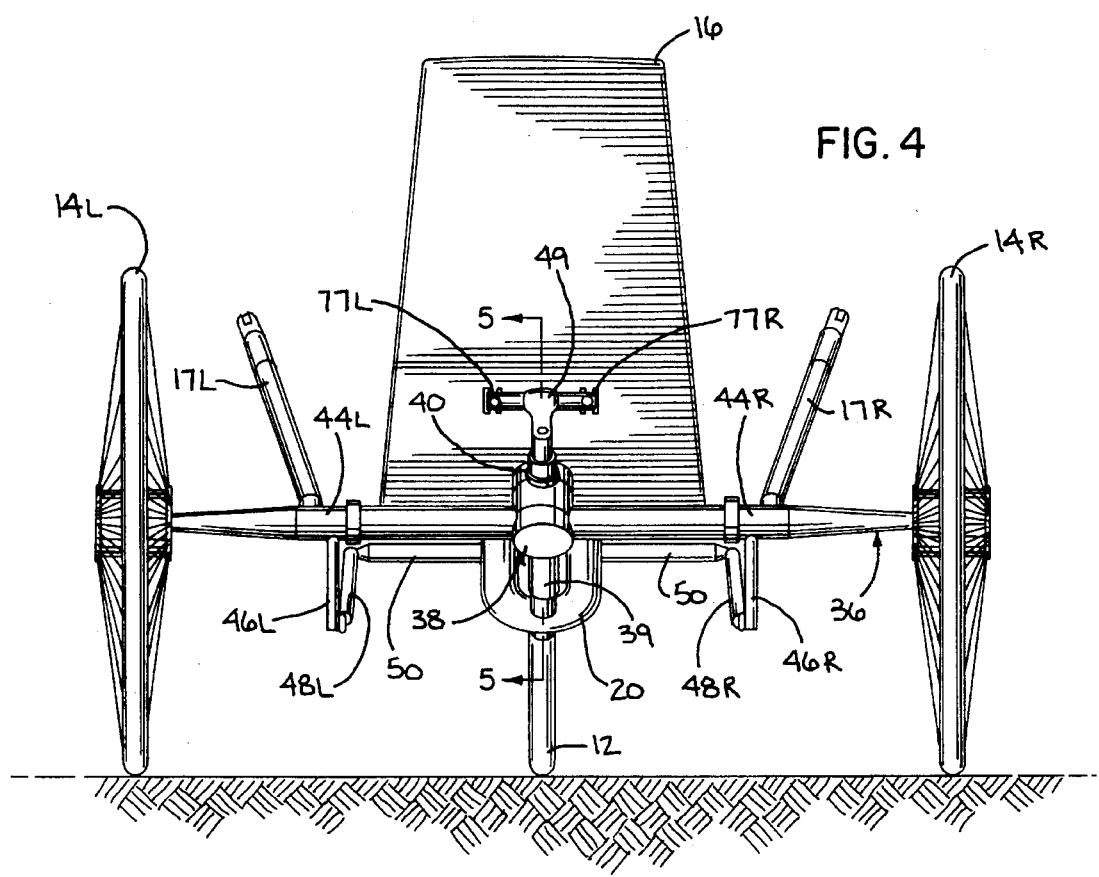
FIG. 4 is a rear view of the cycle illustrated in FIG. 1.
Figure 5:
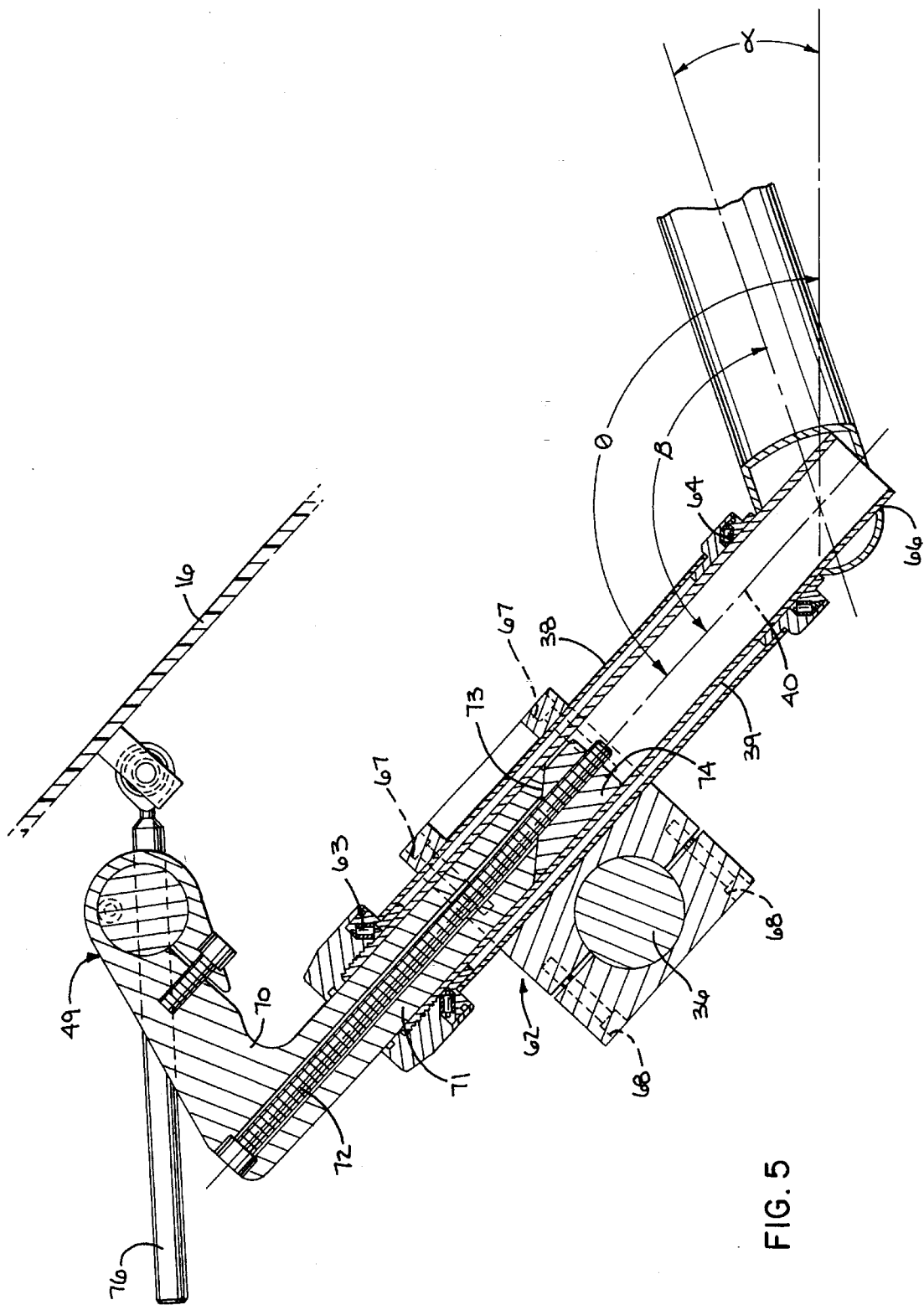
FIG. 5 is an enlarged fragmenting cross-sectional view seen substantially along 5—5 in FIG. 4.

To more particularly illustrate the rotation of frame extension 39 within pivot housing 38, reference is made to FIG. 5, showing a cross-section as seen along line 5—5 in FIG. 4. The frame extension 39 is more particularly formed from an inner tube or post rotatably disposed within the pivot housing 38 in the form of an outer barrel. The pivot post or tube 39 is fixed to the tubular frame 20 at 66, as by welding (weld joint not shown), so that the post 39 maintains a fixed relationship with frame 20. Similarly, the outer barrel or pivot housing 38 is fixed to a block clamp 62 by bolts 67 (shown in fantom). In turn the block clamp 62 is secured to rear axle 36 at a split joint secured by bolts 68. Bolts 67 are tightened to secure the split joint to the outer barrel 61 of extension 39. The block clamp 62 can be adjusted up or down in the outer barrel and this changes the tilt angle of the pivot axis 40 relative to the horizontal.

As also shown in FIG. 5, anti-friction (i.e., ball or roller bearings 63 and 64 are included to facilitate low-friction engagement, and thus smooth rotation, between the pivot housing 38 and the pivot post 39.

In the preferred embodiment shown in FIG. 5, the brace assembly 49 is utilized to provide added support to the seat 16. The brace includes a neck 70 which is similar to the neck used to support conventional cycle handle-bar assemblies. The neck 70 has a stem 71 telescoped into pivot post 39 and split at 73. As is typical of such assemblies, a bolt 72 threads through the stem 71 and tightens to secure nut 74 at split 73. The angle of split 73 forces nut 74 and stem 72 against opposing sidewalls of pivot post 39, to secure the neck 70 in place. As illustrated, the neck carries supports 76 that attach to and stabilize the back of the seat 16. Preferably the supports 76 are adjustably connected to the neck 70 such as by adjusting clamp collars 77 so that the angle of inclination of the seat may be adjusted.

As previously mentioned, pivoting the frame assembly with respect to the axle 36, as illustrated, effectively tilts the frame and leans the rider into the turn. This is particularly desirable when racing or otherwise travelling at higher speeds, as centrifugal forces act upon both the rider and the cycle 10 during turns. Indeed, this feature allows the cycle 10 to make tighter turns at higher rates of speed than conventional, upright three-wheel cycles.

The relative dimensions shown in the illustrated embodiment reflect the preferred dimensions for achieving overall quality performance, for general purpose riding usage. This includes factors such as weight distribution, ease for rider to get into and out of seat 16, storage, and performance and handling characteristics. It will be understood that the wheelbase and/or the steering linkage dimensions may be varied to alter the foregoing characteristics to provide, for example, a sharper turning radius.

In the preferred embodiment, the rear axle 36 is made adjustable, whereby the width of the wheel base may be varied to accommodate a variety of riding situations (e.g. performance goals) and conditions. Means for varying the spacing or separation between rear wheels 14R and 14L, for example, may be provided by a laterally outer section on either end of the axle 36 that is adapted to telescope into and out of a central section. The length of crank arms 46L and 46R may also be varied to adjust the leverage and therefore the steering ease and ratio. Furthermore, the seat 16 may be adjustably secured to the frame 20 so as to be movable toward and away from the pedal assembly 18. Changing the seat location, of course, changes the rider's weight distribution between the front wheel 12 and the rear wheels 14L and 14R. In order to accommodate cyclists having long or short legs, the crank assembly 18 preferably is adjustably mounted on the forward extension 24 of the frame 20 such as by an adjustable clamp block 25.

The angle of pivot housing 38 and pivot post 39 may be varied to alter the tilt/turn steering components. Angles $\alpha$ and $\beta$ (see FIG. 5) depict the respective angles between the frame 20 and the horizontal, and between frame 20 and pivot post extension 39, and these angles may be varied to alter the tilt/turn characteristics. The sum of angles $\alpha$ and $\beta$ is $\phi$ which is the angle of inclination of the pivot axis 40 to the horizontal. It will be understood, of course, that the tilt and turn characteristics go hand-in-hand. That is, as the dimensions are altered to increase the tilting or banking component, the turning (e.g., left and right) component is decreased.

It will be also appreciated that the angle of inclination ϕ of the pivot axis 40 determines the relative amount of tilt of the frame 20 relative to the amount of swing or pivot of the rear axle 36. Thus, if the pivot axis 40 is vertical (i.e., ϕ=90°), the rear axle pivots or swings horizontally about that vertical axis but the frame does not tilt or lean relative to a horizontal axis, Conversely, if the pivot axis 40 was horizontal (i.e., ϕ=180°), the frame would pivot, tilt or roll about that axis but the rear axle would not pivot or swing to provide turning.

In accordance with the present invention the improved steering of the cycle 10 is arranged to provide simultaneous and synchronized tilting of the frame and pivoting of the axle with respect to each other. Referring to FIG. 2, line T defines the roll or tilt axis of the cycle. At one end line T passes through the point where a vertical line from the rear axle intersects the pivot axis 40. At the other end, the line T connects the point of tangency where the front wheel 12 engages the ground. The roll or tilt axis T is disposed at an angle Θ to the horizontal. As in FIG. 5, the angle of the pivot axis 40 to the horizontal is represented by ϕ. Preferably, the pivot angle ϕ of the pivot axis 40 should be greater than 90° but less than the angle Θ. As shown in FIG. 2, ϕ is about 135° and Θ is about 160°. These angles may, of course, be changed to suit the particular geometry of the cycle and to suit the preference of the cyclist and the type of cycling to be engaged in.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A recumbent cycle comprising:

a front wheel including a drive hub journalled in bearings;

a pair of rear wheels disposed in spaced-apart parallel relation and rotatably supported by a rear axle;

a frame assembly movably attached to the rear axle, the frame assembly including a seat disposed in a recumbent position, the frame assembly further including a forward mount disposed to support the front wheel bearings and drive hub;

drive means for rotating the front wheel to propel the cycle;

steering means including a pivot carried on the rear axle defining a pivot axis above which the frame assembly tilts and pivots with respect to the rear axle, the pivot axis being disposed in a plane substantial transverse to the rear axle and at a predetermined angel ϕ inclined upwardly and rearwardly from the rear axle;

the steering means further including two laterally spaced-apart steering levers with each steering lever being mounted on and disposed for rotation about the rear axle for moving the frame assembly relative to the rear axle, the frame assembly and forward mount carrying the front wheel so as to steer the cycle.

2. The cycle according to claim 1, wherein the angle ϕ is an obtuse angle relative to the horizontal and the steering means includes means interconnecting each steering lever and the frame assembly for pivoting and tilting the frame assembly about the pivot axis as the steering levers are rotated about the rear axle in opposite directions with respect to each other.

3. The cycle according to claim 2, wherein the interconnecting means includes a tie rod connected between each steering lever and the frame assembly, each tie rod being reciprocated by rotation of the corresponding steering lever, wherein reciprocation of the tie rods in opposite directions with respect to each other pivots the frame assembly relative to the rear axle.

4. The cycle according to claim 3 wherein the cycle has a true tilt axis T defined by a line having one end passing through the point where a vertical line extending upwardly from the axle intersects the pivot axis and having another end intersecting the tangent point of the front wheel and the ground, the tilt axis T being inclined upwardly and rearwardly at an obtuse angle Θ relative to the horizontal.

5. The cycle according to claim 4 wherein the pivot angle ϕ is greater than 90° and less than the tilt angle Θ.

6. The cycle according to claim 5 wherein the pivot angle ϕ is about 135°.

7. The cycle according to claim 1, wherein the drive means includes a pair of foot pedals, crank arms and a drive sprocket disposed for rotation by a cyclist seated in the seat.

8. The cycle according to claim 7, wherein the drive means further includes a chain and sprocket assembly for rotating the front wheel in response to rotation of the foot pedals, crank arms and drive sprocket.

9. The cycle according to claim 8, wherein the chain and sprocket assembly includes a plurality of axially aligned sprockets and means for selectively engaging the chain with each of the axially aligned sprockets to provide a multiple speed drive.

10. A recumbent cycle comprising:

two rear wheels disposed in parallel spaced-apart relation and rotatably supported on a rear axle;

a front wheel rotatably supported on a frame;

a seat fixed to the frame and disposed to support a rider in a recumbent position, the seat and frame being pivotally attached to and supported on the rear axle, the pivot axis being disposed in a plane substantially transverse to the rear axle, the plane intersecting the rear axle adjacent the transverse center thereof, and the pivot axis being inclined upwardly and rearwardly from the rear axle at an angle ϕ relative to the horizontal;

drive means for rotating at least one of the wheels to propel the cycle;

steering means for steering the cycle by pivoting the seat and frame about the upwardly and rearwardly inclined pivot axis, the frame guiding the front wheel into the direction of travel;

the steering means including two laterally spaced-apart steering levers, each steering lever being mounted on and disposed for rotation about the rear axle; and the steering means further including a tie rod connected between each steering lever and the frame assembly, each tie rod being reciprocate by rotation of the corresponding steering lever, wherein reciprocation of the tie rods in opposite directions with respect to each other pivots and tilts the frame assembly and seat relative to the rear axle.

11. The cycle according to claim 10, wherein the drive means includes a pair of foot pedals, crank arms and a drive sprocket disposed for rotation by a cyclist seated in the seat; and the drive means further includes a chain and a sprocket assembly for rotating the front wheel in response to rotation of the pedals, crank arms and drive sprocket.

12. The cycle according to claim 11, wherein the chain and sprocket assembly includes a plurality of axially aligned sprockets and means for selectively engaging the chain with each of the axially aligned sprockets to provide a multiple speed drive.

13. The cycle according to claim 10 wherein the cycle has a true tilt axis T defined by a line having one end passing through the point where a vertical line extending upwardly from the axle intersects the pivot axis and having another end intersecting the tangent point of the front wheel and the ground, the tilt axis T being inclined upwardly and rearwardly at an obtuse angle $\Theta$ relative to the horizontal.

14. The cycle according to claim 13 wherein the pivot angle $\phi$ is greater than 90° and less than the tilt angle $\Theta$.

15. The cycle according to claim 14 wherein the pivot angle $\phi$ is about 135°.

16. In a recumbent cycle having two rear wheels disposed in spaced-apart relation on an axle, the axle supporting a frame assembly that includes a seat, the frame assembly rotatably supporting a front wheel, and drive means for rotating the front wheel to propel the cycle, a steering assembly comprising:

a pivot assembly having an upwardly and rearwardly inclined pivot axis carried on the axle and pivotally attaching the frame assembly to the axle;

a pair of tie-rods, one tie-rod disposed on each side of the frame assembly, the tie-rods being attached between the frame assembly and the axle;

a pair of steering levers rotatably attached to the axle and disposed to reciprocate the tie-rods, wherein rotation of the steering levers pivots the frame assembly and seat with respect to the axle, thereby steering the cycle to turn in the direction defined by the relative pivotal movement of the frame assembly, and tilting the frame and seat inwardly in the direction of the turn.

17. The cycle according to claim 16 wherein the pivot axis is upwardly and rearwardly inclined at an obtuse angle $\phi$ relative to the horizontal, the angle $\phi$ being greater than 90° and less than 180°.

18. The cycle according to claim 17 wherein the cycle has a true tilt axis T defined by a line having one end passing through the point where a vertical line extending upwardly from the axle intersects the pivot axis and having another end intersecting the tangent point of the front wheel and the ground, the tilt axis T being inclined upwardly and rearwardly at an obtuse angle e relative to the horizontal.

19. The cycle according to claim 18 wherein the pivot angle $\phi$ is greater than 90° and less than the tilt angle $\Theta$.

20. The cycle according to claim 19 wherein the pivot angle $\phi$ is about 135°.

* * * * *

UNITED STATES PATENT AND TRADEMARK OFFICE
CERTIFICATE OF CORRECTION

PATENT NO. : 5,568,935
DATED     : October 29, 1996
INVENTOR(S) : William P. Mason It is certified that error appears in the above-indentified patent and that said Letters Patent is hereby corrected as shown below:

In Column 7, line 9: "axis, Conversely" should read --axis. Conversely--.

In Column 10, line 25: "angle e" should read --angle Θ--.

Signed and Sealed this

Thirteenth Day of May, 1997

*Attest:*

BRUCE LEHMAN

*Attesting Officer*     *Commissioner of Patents and Trademarks*